United States Patent
Xia et al.

(10) Patent No.: US 10,382,843 B2
(45) Date of Patent: Aug. 13, 2019

(54) COLORLESS, DIRECTIONLESS, CONTENTIONLESS, SPACELESS, AND FLEXIBLE GRID RECONFIGURABLE OPTICAL NODE

(71) Applicant: Verizon Patent and Licensing Inc., Arlington, VA (US)

(72) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 51 days.

(21) Appl. No.: 15/245,878

(22) Filed: Aug. 24, 2016

(65) Prior Publication Data

US 2018/0063607 A1    Mar. 1, 2018

(51) Int. Cl.
| | |
|---|---|
| *H04J 14/02* | (2006.01) |
| *H04J 14/04* | (2006.01) |
| *H04Q 11/00* | (2006.01) |
| *H04B 10/2581* | (2013.01) |

(52) U.S. Cl.
CPC ..... *H04Q 11/0005* (2013.01); *H04B 10/2581* (2013.01); *H04J 14/04* (2013.01); *H04Q 11/0001* (2013.01); *H04J 14/0212* (2013.01); *H04Q 2011/0015* (2013.01); *H04Q 2011/0016* (2013.01); *H04Q 2011/0024* (2013.01); *H04Q 2011/0039* (2013.01); *H04Q 2011/0041* (2013.01); *H04Q 2011/0049* (2013.01)

(58) Field of Classification Search
CPC ........ H04J 14/02; H04J 14/00; H04B 10/564; H04B 10/275; H04Q 11/02; G02B 6/14

USPC ............ 398/48, 44, 79, 45, 49, 139, 43, 85; 370/542; 352/28
See application file for complete search history.

(56) References Cited

U.S. PATENT DOCUMENTS

| | | | | |
|---|---|---|---|---|
| 5,621,829 A | * | 4/1997 | Ford | G02B 6/359 385/115 |
| 5,912,751 A | * | 6/1999 | Ford | H04B 10/506 398/139 |
| 6,002,818 A | * | 12/1999 | Fatehi | H04Q 11/0005 385/16 |
| 6,023,361 A | * | 2/2000 | Ford | H04B 10/506 398/135 |

(Continued)

OTHER PUBLICATIONS

Wikipedia, "Optical add-drop multiplexer," https://en.wikipedia.org/wiki/Optical_add-drop_multiplexer, Apr. 28, 2015, 2 pages.

(Continued)

*Primary Examiner* — Abbas H Alagheband

(57) ABSTRACT

An optical node may include an optical switch and an optical add drop multiplexer (OADM). The optical switch may receive, via a space-division multiplexing (SDM) link that carries optical signals via multiple SDM elements, an optical signal to be switched from a first SDM element to a second SDM element. The multiple SDM elements may include multiple cores of a multi-core fiber, multiple modes of a multi-mode fiber, or multiple fibers of a fiber bundle. The optical switch may switch the optical signal from the first SDM element to the second SDM element. The OADM may add optical signals to an optical network or drop optical signals from the optical network via one or more SDM links that include the SDM link.

22 Claims, 8 Drawing Sheets

(56) References Cited

U.S. PATENT DOCUMENTS

| | | | | |
|---|---|---|---|---|
| 6,097,519 | A * | 8/2000 | Ford | H04J 14/02 385/37 |
| 6,396,976 | B1 * | 5/2002 | Little | G02B 6/357 385/17 |
| 6,498,872 | B2 * | 12/2002 | Bouevitch | G02B 6/2766 359/246 |
| 6,618,517 | B2 * | 9/2003 | Ducellier | G02B 6/3512 385/17 |
| 7,248,758 | B2 * | 7/2007 | Xia | G02B 6/29361 385/15 |
| 7,400,793 | B2 * | 7/2008 | Tabuchi | G02B 6/12011 385/24 |
| 7,620,321 | B2 * | 11/2009 | Miura | H04J 14/0209 398/45 |
| 8,218,918 | B2 * | 7/2012 | Tigli | G02B 6/359 385/115 |
| 8,251,521 | B2 * | 8/2012 | Mizushima | G02B 6/06 353/11 |
| 8,705,913 | B2 * | 4/2014 | Winzer | G02B 6/14 385/28 |
| 9,025,915 | B2 * | 5/2015 | Mahlab | G02B 6/3508 385/16 |
| 9,207,401 | B2 * | 12/2015 | Winzer | G02B 6/14 |
| 9,335,477 | B2 * | 5/2016 | Fontaine | G02B 6/28 |
| 9,344,779 | B2 * | 5/2016 | Sethumadhavan | H04J 14/04 |
| 9,362,708 | B2 * | 6/2016 | Ryf | H01S 3/06754 |
| 9,509,408 | B2 * | 11/2016 | Simonneau | H04B 10/25 |
| 9,548,834 | B2 * | 1/2017 | Roorda | H04J 14/0212 |
| 9,570,880 | B2 * | 2/2017 | Fermann | H01S 3/067 |
| 9,609,401 | B2 * | 3/2017 | Takeshita | H04Q 11/0005 |
| 9,768,909 | B2 * | 9/2017 | Huang | H04J 14/00 |
| 9,794,016 | B2 * | 10/2017 | Li | H04J 14/04 |
| 9,995,879 | B2 * | 6/2018 | Winzer | G02B 6/14 |
| 2003/0059154 | A1 * | 3/2003 | Sato | G02B 6/356 385/17 |
| 2006/0098981 | A1 * | 5/2006 | Miura | H04J 14/0209 398/45 |
| 2011/0176804 | A1 * | 7/2011 | Blinkert | G02B 6/356 398/45 |
| 2013/0236175 | A1 * | 9/2013 | Sethumadhavan | H04J 14/04 398/55 |
| 2014/0023373 | A1 * | 1/2014 | Tosaki | H04J 14/0204 398/83 |
| 2014/0140694 | A1 * | 5/2014 | Zhou | H04J 14/02 398/44 |
| 2014/0161390 | A1 * | 6/2014 | Winzer | G02B 6/14 385/28 |
| 2014/0177658 | A1 * | 6/2014 | Chowdhury | H04J 14/0212 370/542 |
| 2014/0219657 | A1 * | 8/2014 | Simonneau | H04Q 11/0005 398/49 |
| 2014/0341583 | A1 * | 11/2014 | Wu | G02B 6/29313 398/85 |
| 2015/0063807 | A1 * | 3/2015 | Simonneau | H04B 10/25 398/59 |
| 2015/0085884 | A1 * | 3/2015 | Fontaine | H04J 14/06 370/542 |
| 2015/0086199 | A1 * | 3/2015 | Ryf | H01S 3/06754 398/43 |
| 2015/0098700 | A1 * | 4/2015 | Zhu | H04Q 11/0005 398/48 |
| 2015/0289036 | A1 * | 10/2015 | Takeshita | H04J 14/0212 398/48 |
| 2015/0365186 | A1 * | 12/2015 | Schimpe | H04J 14/021 398/50 |
| 2016/0036549 | A1 * | 2/2016 | Roorda | H04J 14/0212 398/49 |
| 2016/0043826 | A1 * | 2/2016 | Zhou | H04J 14/02 398/44 |
| 2016/0072587 | A1 * | 3/2016 | Pilipetskii | H04B 10/564 398/79 |
| 2016/0149664 | A1 * | 5/2016 | Wagener | H04J 14/0212 398/49 |

OTHER PUBLICATIONS

Larrigan, "CDC-F optical networks propel us forward," http://insight.nokia.com/cdc-f-optical-networks-propel-us-forward, Mar. 15, 2015, 5 pages.

Wikipedia, "Optical mesh network," https://en.wikipedia.org/wiki/Optical_mesh_network, Apr. 18, 2016, 7 pages.

Wikipedia, "Reconfigurable optical add-drop multiplexer," https://en.wikipedia.org/wiki/Reconfigurable_optical_add-drop_multiplexer, Mar. 2, 2013, 2 pages.

Richardson et al., "Figure 2: Different approaches for realizing SDM," http://www.nature.com/nphoton/journal/v7/n5/fig_tab/nphoton.2013.94_F2.html, 1 page.

Gringeri et al., "Flexible Architectures for Optical Transport Nodes and Networks," https://www.icg.isy.liu.se/en/courses/optical/Flexible_Nodes.pdf, Jul. 2010, 11 pages.

* cited by examiner

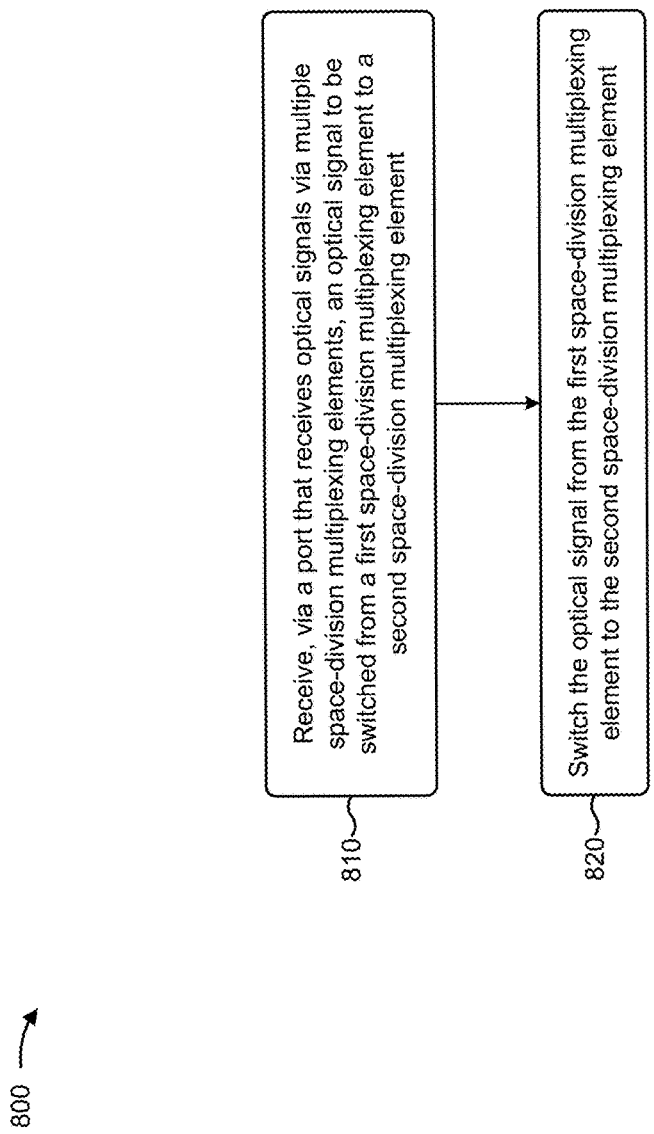

US 10,382,843 B2

COLORLESS, DIRECTIONLESS, CONTENTIONLESS, SPACELESS, AND FLEXIBLE GRID RECONFIGURABLE OPTICAL NODE

BACKGROUND

In an optical network, optical signals may be transmitted at various wavelengths, with each wavelength corresponding to a transmission channel. Optical links may connect optical nodes so that signals may be transmitted throughout the optical network. An optical route may use a series of network nodes and optical links to connect a source of an optical transmission with a destination for the optical transmission.

As optical link bandwidth demand increases, reconfigurable optical add-drop multiplexers (ROADMs) have seen increasing usage as optical nodes. An optical network that is implemented using ROADMs can be reconfigured without physical modification of components of the ROADMs, which improves flexibility and peak bandwidth of the optical network. A ROADM may include a wavelength selective switch (WSS), which includes a switching array that routes optical signals to particular output ports based on wavelengths of the optical signal.

BRIEF DESCRIPTION OF THE DRAWINGS

FIG. 8 is a flow chart of an example process for space-division multiplexing; and

DETAILED DESCRIPTION OF PREFERRED EMBODIMENTS

The following detailed description of example implementations refers to the accompanying drawings. The same reference numbers in different drawings may identify the same or similar elements.

As demand for optical network capacity grows, more than one fiber, core, or transmission mode may be needed to transmit optical signals between two optical nodes. Space-division multiplexing (SDM) may be used for parallel optical transmission, and permits transmission in parallel optical paths using multiple fiber cores (e.g., in a multi-core fiber), multiple optical modes (e.g., in a multi-mode fiber), and/or multiple fibers (e.g., in a fiber bundle). Optical components, such as optical switches and optical add-drop multiplexers (OADMs) will be needed to support SDM. Implementations described herein include an optical switch and an OADM that support SDM, thereby assisting with increasing network capacity.

As an example, an optical switch described herein may be referred to as a spaceless wavelength selective switch (SWSS) with a flexible grid (SWSS-F), where spaceless refers to the capability of the optical switch to switch optical signals between multiple SDM elements (e.g., multiple cores, modes, and/or fibers). As another example, an OADM described herein may be referred to as a colorless, directionless, contentionless, and spaceless (CDCS) with a flexible grid (CDCS-F) OADM, where optical signals can be transmitted or received at different wavelengths, transmitted to or received from different directions, transmitted or received without wavelength contention, and transmitted or received via any SDM element.

Figure 1:
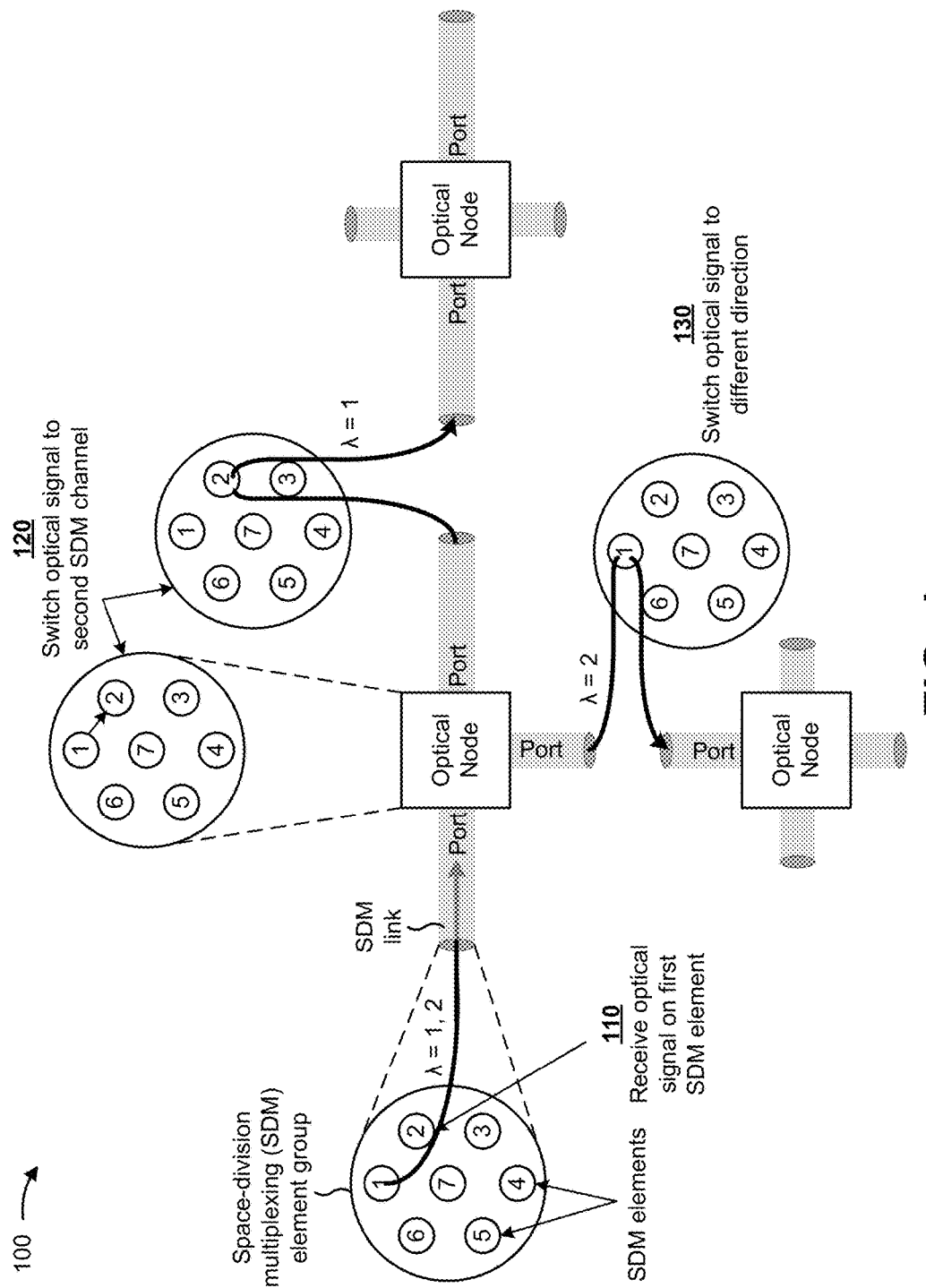
FIG. 1 is a diagram of an overview of an example implementation described herein.

FIG. 1 is a diagram of an overview of an example implementation 100 described herein. As shown in FIG. 1, and by reference number 110, an optical node may receive an optical signal via a first SDM element. The first SDM element may be an SDM element included in a group of SDM elements, referred to herein as an SDM element group. For example, the SDM element group may include a group of optical fibers (e.g., a fiber bundle), and the SDM element may include a single optical fiber included in the group of optical fibers. As another example, the SDM element group may include a group of optical cores of an optical fiber, and the SDM element may include a single optical core included in the group of optical cores. As another example, the SDM element group may include a group of modes (e.g., a group of optical transmission modes with different spatial distribution of optical intensity), and the SDM element may include a single optical mode included in the group of optical modes. As shown, the optical node may transmit or receive an optical signal via multiple SDM elements of an SDM element group via an SDM link that connects to a port of the optical node.

In the example shown in FIG. 1, assume that the optical node receives, via the first SDM element (shown as a core labeled with a 1), a first optical signal at a first wavelength (e.g., $\lambda=1$) and a second optical signal at a second wavelength (e.g., $\lambda=2$). In some implementations, the optical node may switch an optical signal from a first SDM element to a second SDM element. For example, as shown by reference number 120, the optical node may switch the first optical signal at the first wavelength ($\lambda=1$) from a first core to a second core (shown as a core labeled with a 2), and may output the first optical signal via the second SDM element (e.g., the second core).

Additionally, or alternatively, the optical node may switch an optical signal from a first direction (e.g., via a first SDM link) to a second direction (e.g., via a second SDM link). For example, as shown by reference number 130, the optical node may switch the second optical signal at the second wavelength ($\lambda=2$) from the first SDM link (e.g., travelling from left to right as depicted) to a second SDM link (e.g., travelling from top to bottom as depicted), and may output the second optical signal via the second SDM link (e.g., in the second direction).

In this way, the optical node may support space-division multiplexing, thereby increasing network capacity. Additional details regarding the optical node are described in more detail elsewhere herein.

As indicated above, FIG. 1 is provided merely as an example. Other examples are possible and may differ from what was described with regard to FIG. 1.

Figure 2:
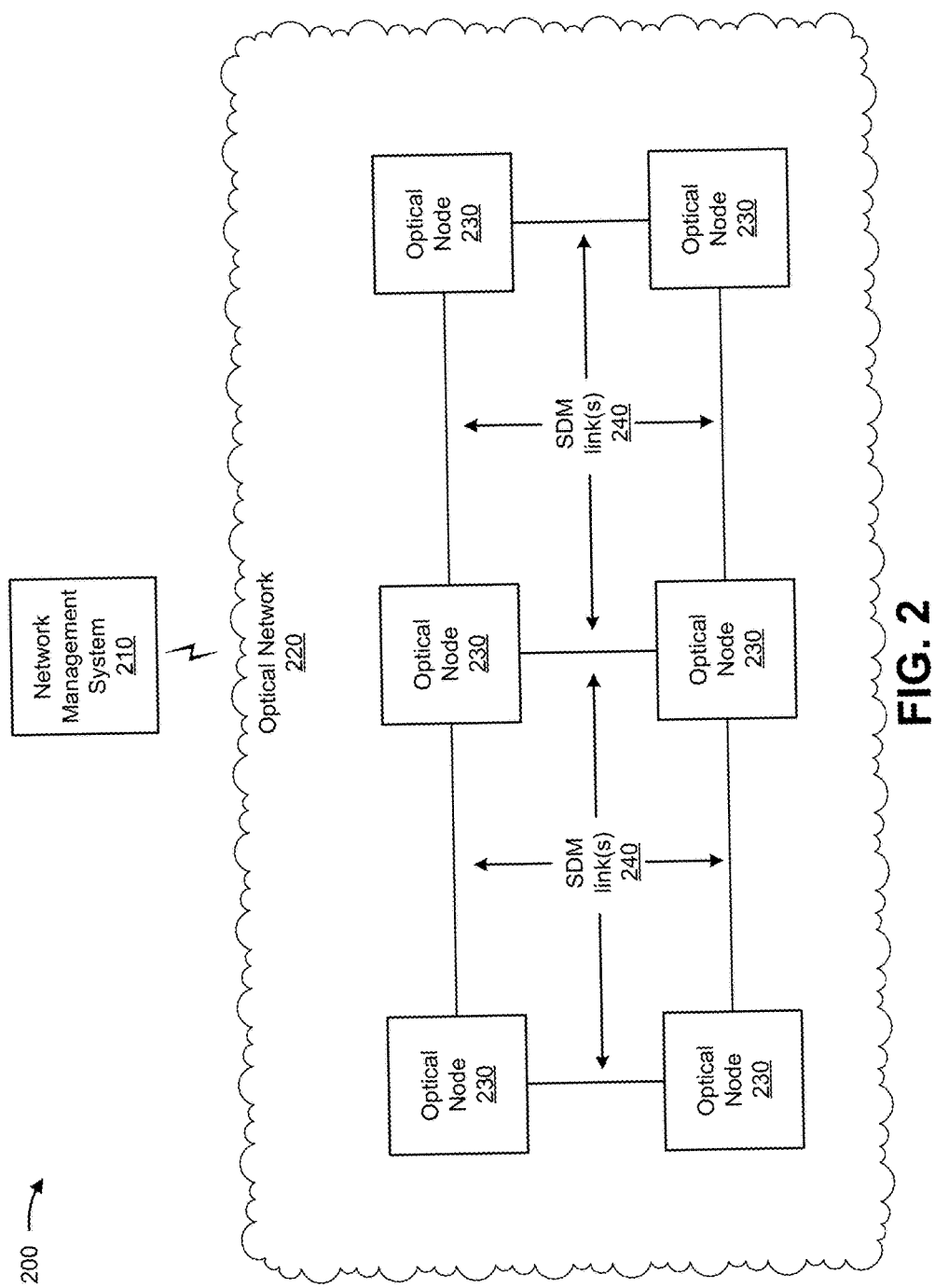
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network management system 210 and an optical network 220 that includes multiple optical nodes 230 interconnected via space-division multiplexing links 240.

Network management system 210 includes one or more devices capable of receiving, generating, storing, processing, and/or providing optical network information. For example, network management system 210 may include a computing device, such as a server, a desktop computer, a laptop computer, or a similar type of device. Network management system 210 may assist a user (e.g., a network administrator) in configuring optical network 220. For example, network management system 210 may assist in modeling and/or planning an optical network configuration, which may include quantities, locations, capacities, parameters, switching configurations, and/or add-drop configurations of optical nodes 230, characteristics and/or configurations (e.g., capacities) of SDM links 240 between optical nodes 230, traffic demands of optical nodes 230 and/or SDM links 240, or the like. For example, network management system 210 may output configuration information to configure an OADM and/or an optical switch of optical node 230. In some implementations, network management system 210 may provide optical network information for display so that a network administrator may interact with network management system 210 to view and/or modify the optical network information.

Optical network 220 includes a network that uses light as a transmission medium. For example, optical network 220 may include a fiber-optic based network, an optical transport network, a light-emitting diode network, a laser diode network, an infrared network, and/or a combination of these or other types of optical networks. Optical network 220 may include one or more optical routes (e.g., optical lightpaths), that may specify a path along which light is carried (e.g., using one or more optical links, such as SDM links 240) between two or more optical nodes 230.

Optical node 230 includes one or more devices capable of receiving, generating, storing, processing, and/or providing data, carried by an optical signal, via an optical link. For example, optical node 230 may include one or more optical data processing and/or optical traffic transfer devices, such as an OADM, an optical switch, an optical amplifier (e.g., a doped fiber amplifier, an erbium doped fiber amplifier, a Raman amplifier, etc.), an optical source device (e.g., a laser source), an optical destination device (e.g., a laser sink), an optical multiplexer, an optical demultiplexer, an optical transmitter, an optical receiver, an optical transceiver, or the like. Optical node 230 may process and/or transmit optical signals (e.g., to other optical node(s) 230 via an optical link) to deliver the optical signals through optical network 220. In some implementations, optical node 230 includes a colorless, directionless, and contentionless (CDC) optical node. For example, optical node 230 may include one or more components to permit colorless, directionless, and contentionless switching and/or add drop multiplexing, as well as spaceless switching and/or add drop multiplexing (e.g., among SDM elements and/or SDM links). Additional details of optical components included in optical node 230 are described herein in connection with FIG. 4.

SDM link 240 includes an optical link via which light is carried via multiple SDM elements included in an SDM element group, as described in more detail in connection with FIG. 4. In some implementations, SDM link 240 may include one or more optical fibers, such as one or more single mode optical fibers, one or more multi-mode optical fibers, or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
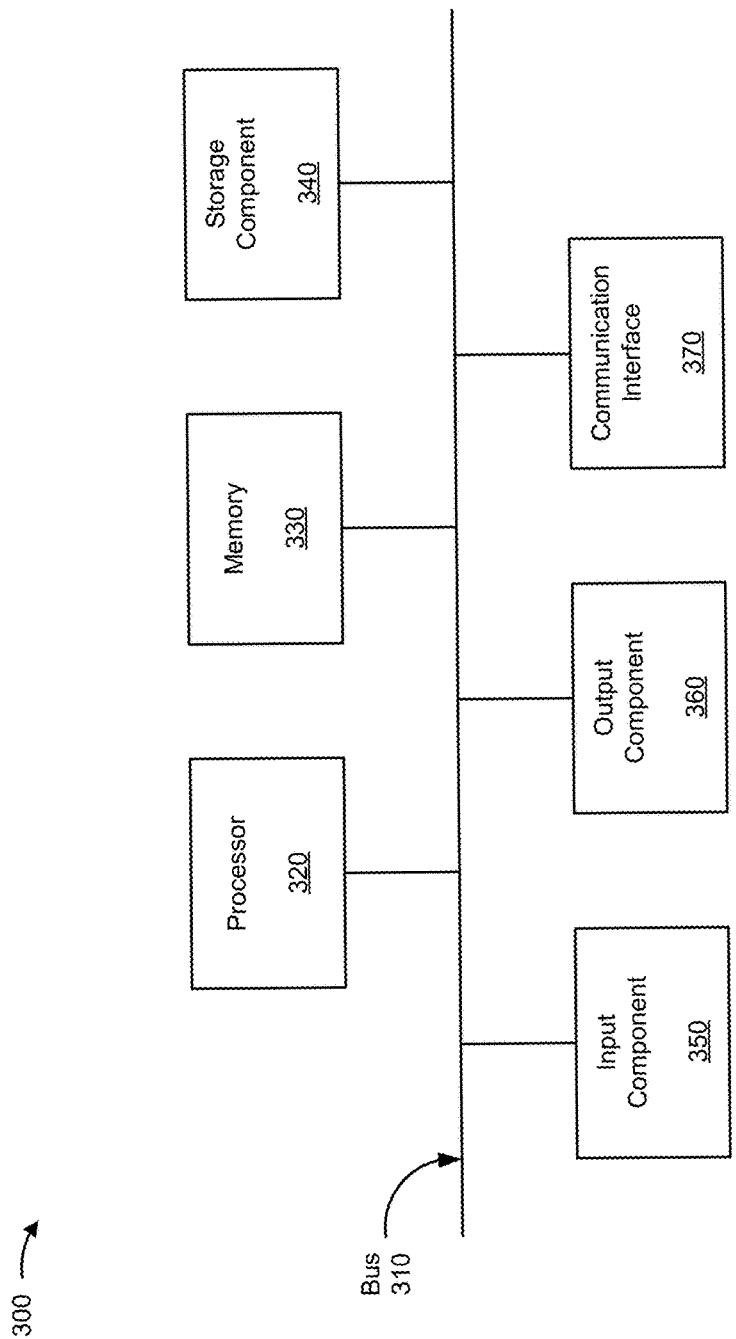
FIG. 3 is a diagram of example components of one or more devices of FIG. 2.

FIG. 3 is a diagram of example components of a device 300. Device 300 may correspond to network management system 210 and/or optical node 230. In some implementations, network management system 210 and/or optical node 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
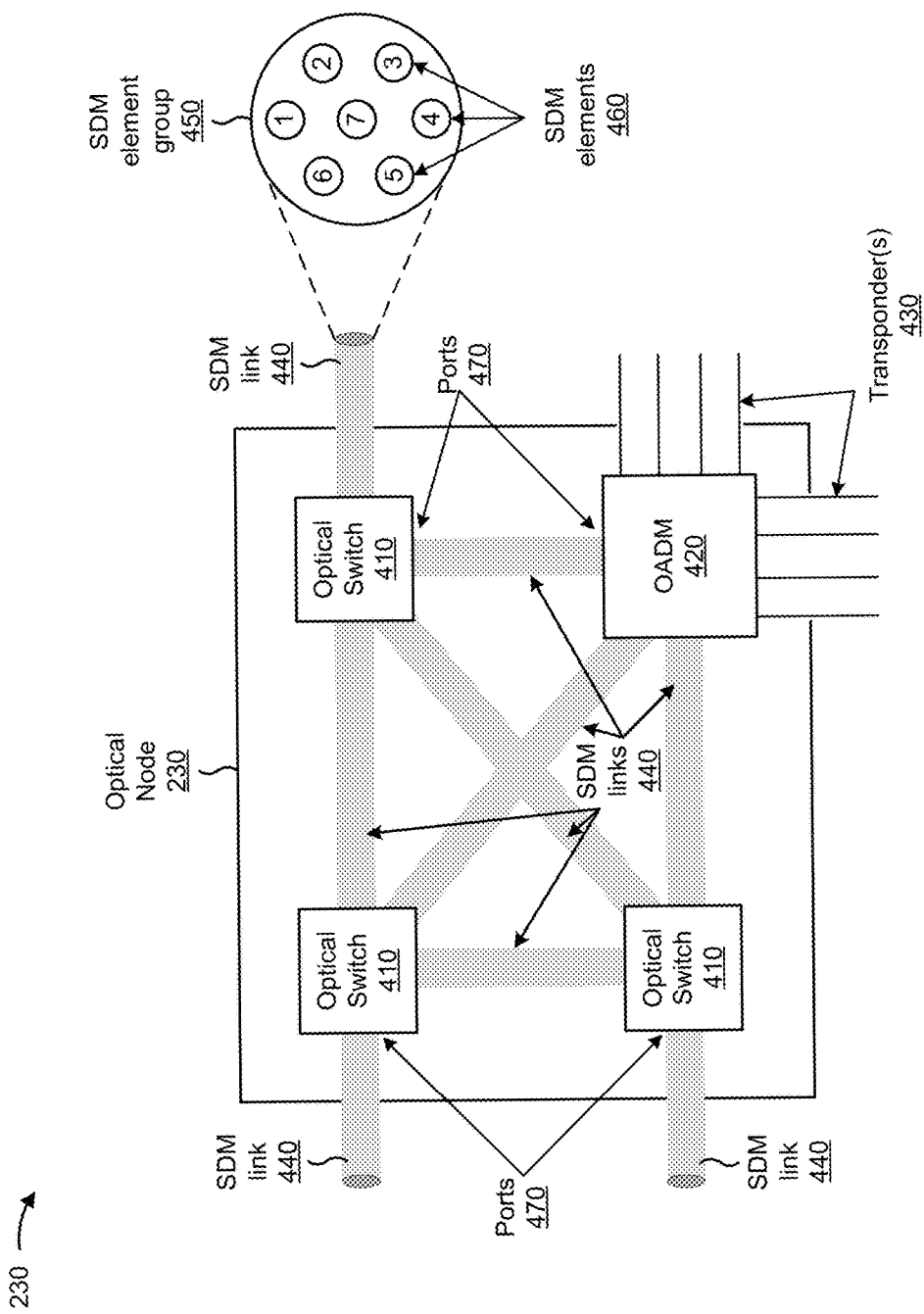
FIG. 4 is a diagram of example components of an optical node described herein.

FIG. 4 is a diagram of example components of optical node 230. As shown in FIG. 4, optical node 230 may include one or more optical switches 410 and one or more OADMs 420. OADM 420 may include a set of transponders 430. Components of optical node 230 may connect via SDM links 440, and optical node 230 may connect to other optical nodes 230 via SDM links 440. SDM link 440 may include an SDM element group 450, which includes a group of SDM elements 460. An SDM link may connect to a component of optical node 230 via a port 470.

Optical switch 410 includes one or more devices capable of switching optical signals (e.g., in a different direction, to a different space-division multiplexing element, or the like). For example, optical switch 410 may include a wavelength selective switch (WSS) capable of switching optical signals to different space-division multiplexing elements, as described herein. Optical switch 410 may be associated with a set of input ports and a set of output ports (e.g., shown as ports 470). Optical switch 410 is capable of providing an optical signal from any one or more of the set of input ports to any one or more of the set of output ports. In some implementations, optical switch 410 may include a programmable switching element. In some implementations, optical switch 410 includes a colorless, directionless, and contentionless (CDC) optical switch. For example, optical switch 410 may include one or more components to permit colorless, directionless, and contentionless switching, as well as spaceless switching (e.g., from a first SDM element 460 to a second SDM element 460).

OADM 420 includes one or more devices capable of multiplexing, de-multiplexing, adding, dropping, and/or routing multiple optical channels into and/or out of optical network 220. For example, OADM 420 may include a reconfigurable optical add-drop multiplexer (ROADM), a flexibly reconfigurable optical add-drop multiplexer (FROADM), or the like. An optical channel may include, for example, an optical sub-carrier, an optical carrier, a data optical channel, an optical super-channel, or a combination of one or more of the above and/or another kind of channel. In some cases, OADM 420 may drop an optical signal via transponder 430, and may allow one or more other optical signals to continue propagating toward a receiver/transceiver device. The dropped optical signal may be provided via transponder 430 to a device (not shown) that may demodulate and/or otherwise process the dropped optical signal to output the data stream carried by the dropped optical signal. In some cases, OADM 420 may add an optical signal to optical network 220 via transponder 430. The added optical signal and the other optical signals, other than the dropped optical signal, may propagate to other OADMs 420 and/or optical nodes 230 in optical network 220. In some implementations, OADM 420 includes a colorless, directionless, and contentionless (CDC) OADM. For example, OADM 420 may include one or more components to permit colorless, directionless, and contentionless optical add drop multiplexing, as well as spaceless optical add drop multiplexing (e.g., among any number of SDM elements 460 on any number of SDM links 440).

In some implementations, optical node 230 may include a controller capable of performing operations related to configuring and operating optical node 230 (e.g., configuring and/or operating optical switch 410 and/or OADM 420). For example, the controller is implemented in hardware, firmware, or a combination of hardware and software, and may include a processor in the form of, for example, a central processing unit, a microprocessor, a digital signal processor, a microcontroller, a field-programmable gate array, an integrated circuit (e.g., an application-specific integrated circuit), or another form of processor. In some implementations, the controller may include one or more processors capable of being programmed to perform a function. The controller may also include a memory, such as a random access memory (RAM), a read only memory (ROM), and/or another type of dynamic or static storage device (e.g., a flash memory, a magnetic memory, an optical memory, etc.) that stores information and/or instructions for use by the controller.

SDM link 440 includes an optical link via which light is carried via multiple SDM elements 460 included in an SDM element group 450. For example, SDM element group 450 may include a group of optical fibers (e.g., a fiber bundle), and a single SDM element 460 may include a single optical fiber included in the group of optical fibers. As another example, SDM element group 450 may include a group of optical cores of an optical fiber, and a single SDM element 460 may include a single optical core included in the group of optical cores. As another example, SDM element group 450 may include a group of modes (e.g., a group of optical transmission modes with different spatial distribution of optical intensity), and a single SDM element 460 may include a single optical mode included in the group of optical modes. Thus, SDM link 440 may include one or more optical fibers, such as one or more single mode optical fibers, one or more multi-mode optical fibers, or the like. In some implementations, a single SDM link 440 (e.g., a single SDM element group 450) may connect to a component of optical node 230 (e.g., optical switch 410, OADM 420, etc.) via a single port 470.

While SDM element group 450 is shown as including seven SDM elements 460 in FIG. 4, in some implementations, SDM element group 450 may include a different number of SDM elements 460 (e.g., fibers, cores, and/or modes), such as two, three, four, five, six, eight, nine, ten, eleven, twelve, etc. SDM elements 460.

The number and arrangement of components shown in FIG. 4 are provided as an example. In practice, optical node 230 may include additional components, fewer components, different components, or differently arranged components than those shown in FIG. 4. For example, while optical node 230 is shown as including three optical switches 410 and one OADM 420, in some implementations, optical node 230 may include a different number of optical switches 410 and/or OADMs 420. Additionally, or alternatively, a set of components (e.g., one or more components) of optical node 230 may perform one or more functions described as being performed by another set of components of optical node 230.

Figure 5:
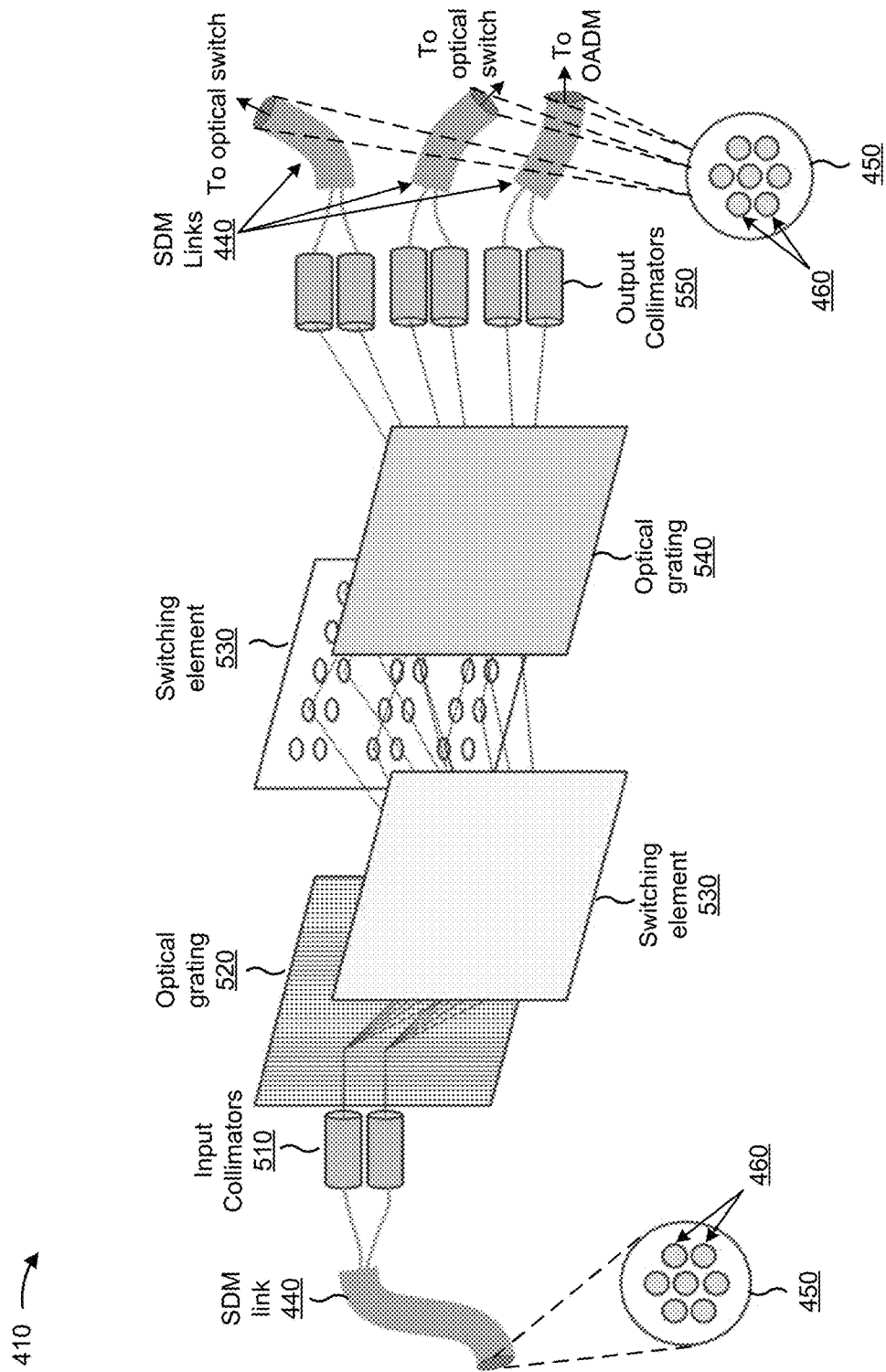
FIG. 5 is a diagram of example components of an optical switch described herein.

FIG. 5 is a diagram of example components of optical switch 410. As shown in FIG. 5, optical switch 410 may include a first set of input collimators 510, a first optical grating 520, one or more switching elements 530, a second optical grating 540, and a second set of output collimators 550. In some implementations, components of optical switch 410 may interconnect via one or more optical waveguides.

Input collimator 510 includes one or more devices capable of narrowing a beam of particles or waves, so as to cause the directions of motions of the particles or waves to become more aligned in a specific direction. For example, input collimator 510 may narrow a beam of light received via an SDM element 460 to direct the beam of light toward optical grating 520. As shown, optical switch 410 may include multiple input collimators 510. Each input collimator 510 may correspond to an SDM element 460 of SDM element group 450 included in an input SDM link 440. In some implementations, a quantity of input collimators 510 included in optical switch 410 may equal a quantity of input SDM elements 460 in an input SDM element group 450 included in an input SDM link 440. In some implementations, a quantity of input collimators 510 included in optical switch 410 may be greater than a quantity of input SDM elements 460 on an input SDM link 440 (e.g., so that optical switch 410 may be adapted for use as additional input SDM elements 460 are added).

Optical grating 520 includes one or more devices capable of splitting and/or diffracting light into several beams travelling in different directions. For example, optical grating 520 may include a diffraction grating, a reflective grating, a transmissive grating, a beam splitter, or a similar type of grating. Optical grating 520 may receive respective light beams from respective input collimators 510, and may diffract each light beam into multiple light beams of different wavelengths travelling in different directions. Optical grating 520 may be positioned and/or configured to direct the multiple light beams of different wavelengths toward different switching components of switching element 530.

Switching element 530 includes one or more devices capable of switching a light beam of a particular wavelength to a different SDM element 460 (e.g., to a fiber, core, or mode that is different from a fiber, core, or mode via which SDM element 460 was received by optical switch 410). For example, switching element 530 may include a controllable mirror array, a liquid crystal on silicon (LCOS) device, a microelectromechanical system (MEMS) device, or the like. Additionally, or alternatively, switching element 530 may include one or more devices capable of switching a light beam of a particular wavelength to a different direction. Optical switch 410 may include one or more switching elements 530 to switch multiple light beams of different wavelengths to a different SDM element 460 and/or a different direction. The example optical switch 410 shown in FIG. 5 includes two switching elements 530 so that any wavelength from any input SDM element 460 can be directed to any output SDM element 460.

In some implementations, a size of switching element 530 may be based on a quantity of SDM elements 460 included in an SDM element group 450 of the SDM links 440 of optical switch 410, a quantity of channels (e.g., wavelengths) per SDM element 460, and/or a quantity of SDM links 440 of optical switch 410 (e.g., a quantity of directions in which light can be received and/or transmitted, a quantity of ports of optical switch 410, etc.). For example, switching element 530 may have a size (e.g., a quantity of switching components, such as mirrors) equal to a quantity of SDM elements 460 (e.g., included in an SDM element group 450 of the SDM links 440 of optical switch 410) multiplied by a quantity of channels per SDM element 460 multiplied by a quantity of SDM links 440 of optical switch 410.

Optical grating 540 includes one or more devices capable of combining light from several beams, travelling in different directions, to a single beam traveling in a single direction. For example, optical grating 540 may include a diffraction grating, a reflective grating, a transmissive grating, a beam combiner, or a similar type of grating. Optical grating 540 may receive multiple light beams of different wavelengths from switching element(s) 530, and may diffract the multiple light beams into a single light beam travelling in a single direction toward respective collimators 560. Optical switch 410 may be configured such that a light beam from a particular input collimator 510 is split by optical grating 520, switched by switching elements 530, recombined by optical grating 540, and directed to a particular output collimator 550.

Output collimator 550 includes one or more devices capable of narrowing a beam of particles or waves, so as to cause the directions of motions of the particles or waves to become more aligned in a specific direction. For example, output collimator 550 may narrow a beam of light received via optical grating 540 to direct the beam of light onto an SDM element 460 of an output SDM link 440. As shown, optical switch 410 may include multiple output collimators 550. Each output collimator 550 may correspond to an output SDM element 460 of an output SDM element group 450 on an output SDM link 440. In some implementations, a quantity of output collimators 550 included in optical switch 410 may equal a quantity of output SDM elements 460 in an output SDM element group 450 included in an output SDM link 440. In some implementations, a quantity of output collimators 550 included in optical switch 410 may be greater than a quantity of output SDM elements 460 (e.g., so that optical switch 410 may be adapted for use as additional output SDM elements 460 are added).

In this way, optical switch 410 may be configured to direct a light beam received via a first SDM element 460 on a first SDM link 440 to a second SDM element 460 (e.g., the same SDM element 460 or a different SDM element 460) on a second SDM link 440 (e.g., in the same direction or a different direction). In this way, optical switch may assist in increasing throughput by the use of multiple SDM elements 460.

The number and arrangement of components shown in FIG. 5 are provided as an example. In practice, optical switch 410 may include additional components, fewer components, different components, or differently arranged components than those shown in FIG. 5. Additionally, or alternatively, a set of components (e.g., one or more components) of optical switch 410 may perform one or more functions described as being performed by another set of components of optical switch 410.

Figure 6:
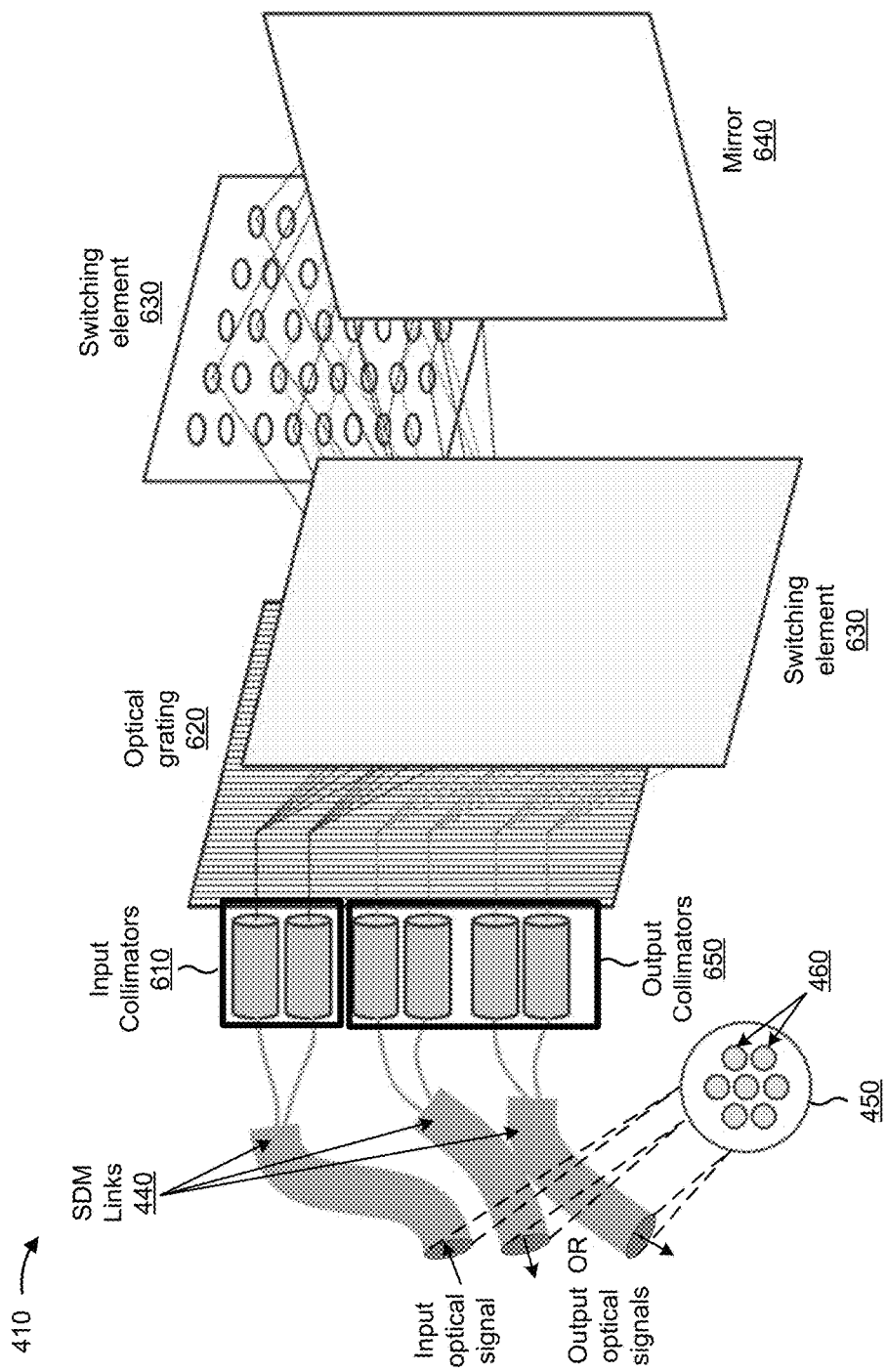
FIG. 6 is another diagram of example components of an optical switch described herein.

FIG. 6 is another diagram of example components of optical switch 410. As shown in FIG. 6, optical switch 410 may include a set of input collimators 610, an optical grating 620, one or more switching elements 630, a mirror 640, and a set of output collimators 650. In some implementations, components of optical switch 410 may interconnect via one or more optical waveguides.

In some implementations, input collimator 610 may correspond to input collimator 510, optical grating 620 may correspond to optical grating 520, switching element 630 may correspond to switching element 530, and/or output collimator 650 may correspond to output collimator 550, as described above in connection with FIG. 5. Mirror 640 includes a reflective surface to direct light back to switching element 630 and/or optical grating 620.

In the configuration shown in FIG. 6, optical switch 410 may be configured to receive an input light beam via an input SDM element 460 and an input collimator 610, which may narrow the light beam to direct the light beam toward optical grating 620. Optical grating 620 may diffract the light beam into multiple light beams of different wavelengths travelling in different directions, so as to direct the multiple light beams of different wavelengths toward different switching components of switching element(s) 630. Switching element(s) may be configured to direct a wavelength from any input SDM element 460 to any output SDM element 460 based on a configuration of switching element(s) 630 (e.g., based on a configuration received from network management system 210).

Switching element(s) 630 may direct the different wavelengths of light toward mirror 640, which may be configured and/or positioned to direct the different wavelengths to different switching components of switching element(s) 630. Switching element(s) 630 may switch the different wavelengths of light, and may provide the different wavelengths of light back to optical grating 620, which may combine the multiple wavelengths, and may output the combined wavelengths via output collimator 650. In this way, a quantity of optical gratings included in optical switch 410 may be reduced (e.g., as compared to the optical switch 410 shown in FIG. 5), which may reduce a cost and complexity of optical switch 410.

The number and arrangement of components shown in FIG. 6 are provided as an example. In practice, optical switch 410 may include additional components, fewer components, different components, or differently arranged components than those shown in FIG. 6. Additionally, or alternatively, a set of components (e.g., one or more components) of optical switch 410 may perform one or more functions described as being performed by another set of components of optical switch 410.

Figure 7:
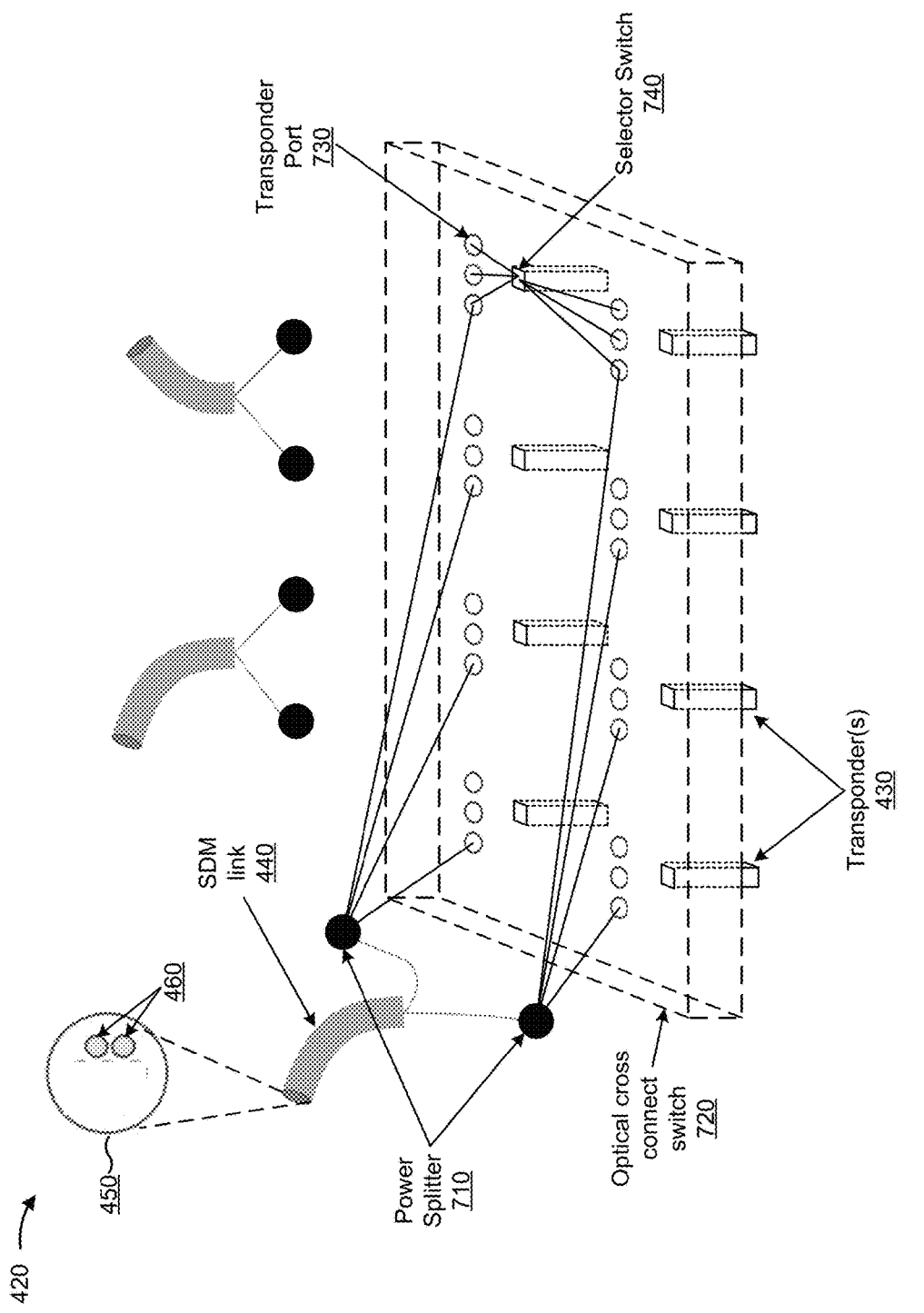
FIG. 7 is a diagram of example components of an OADM described herein.

FIG. 7 is a diagram of example components of OADM 420. As shown in FIG. 7, OADM 420 may include one or more power splitters 710 and an optical cross connect switch 720. Optical cross connect switch may include one or more transponder ports 730 and one or more selector switches 740 to receive or provide optical signal to or from one or more transponders 430 (e.g., described above in connection with FIG. 4). In some implementations, components of OADM 420 may interconnect via one or more optical waveguides.

Power splitter 710 includes one or more devices capable of splitting power of an input light beam and providing the split light beam (e.g., copies of the input light beam) to multiple transponder ports 730. In some implementations, the quantity of power splitters for a particular SDM link 440 may correspond to (e.g., may be equal to) a quantity of SDM elements 460 included in SDM element group 450 of the particular SDM link 440. Thus, OADM 420 may receive an input light beam via an SDM element 460, and the input light beam may be provided to a power splitter 710 positioned to receive the input light beam via the SDM element 460. Power splitter 710 may then provide multiple light beams, formed from the input light beam, to multiple transponder ports 730. Each of the multiple transponder ports 730 may correspond to a different transponder 430, such that power splitter 710 provides a light beam toward each transponder 430.

Selector switch 740 may be configured to transmit or block a received light beam based on a manner in which optical cross connect switch 720 is configured (e.g., by network management system 210). For example, when a light beam is to be output via a transponder 430 (e.g., is to be dropped from optical network 220), transponder port 730 of that transponder 430 may be configured to transmit the light beam (e.g., to allow the light beam to pass through to transponder 430). Conversely, when a light beam is not to be output via a transponder 430, transponder port 730 of that transponder 430 may be configured to block the light beam to prevent the light beam from being transmitted to that transponder 430. In some implementations, selector switch 740 may be configured to drop optical signals (e.g., from optical network 220) received from any SDM link 440 and any SDM element 460 connected to OADM 420.

Additionally, or alternatively, selector switch 740 may receive an optical signal from transponder 430, may determine an SDM link 440 and an SDM element 460 via which the optical signal is to be transmitted, and may output the optical signal via the SDM link 440 and the SDM element 460 (e.g., to add the optical signal to optical network 220). In some implementations, selector switch 740 may be configured to add optical signals (e.g., to optical network 220) to any SDM link 440 and any SDM element 460 connected to OADM 420.

In some implementations, a quantity of transponder ports 730 for a particular transponder 430 may correspond to a total quantity of SDM elements 460 on all SDM links 440 connected to OADM 420. For simplicity, FIG. 7 shows six transponder ports for transponder 430 because the example OADM 420 is connected to three SDM links 440, each having two SDM elements 460. Based on this configuration, any transponder 430 of OADM 420 may receive and/or provide optical signals via any SDM element 460 of any SDM link 440.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

FIG. 8 is a flow chart of an example process 800 for space-division multiplexing. In some implementations, one or more process blocks of FIG. 8 may be performed by optical node 230. In some implementations, one or more process blocks of FIG. 8 may be performed by another device or a group of devices separate from or including optical node 230, such as optical switch 410 and/or OADM 420.

As shown in FIG. 8, process 800 may include receiving, via a port that receives optical signals via multiple space-division multiplexing elements, an optical signal to be switched from a first space-division multiplexing element to a second space-division multiplexing element (block 810).

For example, optical node 230 may receive an optical signal via an SDM link 440 that connects to optical node 230 via a port. SDM link 440 may carry optical signals via multiple SDM elements 460 (e.g., multiple cores, multiples fibers, and/or multiple modes) included in an SDM element group 450. Optical node 230 may be configured to switch the optical signal from a first SDM element 460 (e.g., a first core, a first fiber, and/or a first mode) to a second SDM element 460 (e.g., a second core, a second fiber, and/or a second mode). Additionally, or alternatively, optical node 230 may be configured to switch the optical signal from a first direction (e.g., a first SDM link 440) to a second direction (e.g., a second SDM link 440). Additional details regarding a manner in which the switching is performed are described above.

As shown in FIG. 8, process 800 may include switching the optical signal from the first space-division multiplexing element to the second space-division multiplexing element (block 820). For example, optical node 230 may switch the optical signal from the first SDM element 460 (e.g., a first core, a first fiber, and/or a first mode) to the second SDM element 460 (e.g., a second core, a second fiber, and/or a second mode). Additionally, or alternatively, optical node 230 may switch the optical signal from the first direction (e.g., a first SDM link 440) to the second direction (e.g., a second SDM link 440). Additional details regarding a manner in which the switching is performed are described above.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Implementations described herein include an optical node with an optical switch and/or an OADM that support space-division multiplexing, thereby increasing network capacity.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical switch, comprising:
a plurality of collimators, coupled to a first space-division multiplexing (SDM) link that carries optical signals via multiple SDM elements, to receive an optical signal to be switched from a first SDM element to a second SDM element,
the multiple SDM elements including at least one of:
multiple cores of a multi-core fiber,
multiple modes of a multi-mode fiber, or
multiple fibers of a fiber bundle; and
one or more switching elements to:
switch the optical signal from the first SDM element to the second SDM element,
the one or more switching elements have a size based on:
a quantity of the multiple SDM elements,
a quantity of channels per SDM element of the multiple SDM elements, and
a quantity of SDM links to which the optical switch is connected; and
switch the optical signal from a first direction, corresponding to the first SDM link, to a second direction, corresponding to a second SDM link,
the optical switch including a contentionless and spaceless optical switch.

2. The optical switch of claim 1, where a set of the plurality of collimators connected to the first SDM link corresponds to a set of the multiple SDM elements included in the first SDM link.

3. The optical switch of claim 1, where the optical switch includes a colorless and directionless optical switch.

4. An optical add-drop multiplexer (OADM), comprising:
one or more components to:
receive, via a space-division multiplexing (SDM) link, of a plurality of SDM links connected to the OADM, that carries multiple optical signals via multiple SDM elements, an optical signal,
the multiple SDM elements including at least one of:
multiple cores of a multi-core fiber,
multiple modes of a multi-mode fiber, or
multiple fibers of a fiber bundle;

split, by a power splitter, the optical signal into a split optical signal; and
provide the split optical signal to a transponder,
a set of power splitters of the OADM, including the power splitter, corresponding to a set of the multiple SDM elements included in the SDM link, and
a set of transponder ports of the transponder corresponding to a total set of SDM elements on the plurality of SDM links.

5. The OADM of claim 4, where the one or more components include a selector switch to:
receive the split optical signal; and
provide the split optical signal to the transponder.

6. The OADM of claim 4, where the one or more components include a selector switch to:
selectively drop optical signals from different SDM elements of the SDM link.

7. The OADM of claim 4, where the OADM includes a colorless, directionless, and contentionless (CDC) OADM.

8. An optical node, comprising:
an optical switch to:
receive, via a space-division multiplexing (SDM) link, of a plurality of SDM links connected to an optical add-drop multiplexer (OADM), that carries optical signals via multiple SDM elements, an optical signal to be switched from a first SDM element to a second SDM element,
the multiple SDM elements including at least one of:
multiple cores of a multi-core fiber,
multiple modes of a multi-mode fiber, or
multiple fibers of a fiber bundle; and
the OADM to:
split, by a power splitter, the optical signal into a split optical signal; and
provide the split optical signal to a transponder,
a set of power splitters, including the power splitter, of the OADM corresponding to a set of the multiple SDM elements included in the SDM link, and
a set of transponder ports, of the transponder, corresponding to a total set of SDM elements on the plurality of SDM links.

9. The optical node of claim 8, where the optical switch includes a plurality of collimators connected to the SDM link; and
where a quantity of the plurality of collimators connected to the SDM link corresponds to a quantity of the multiple SDM elements included in the SDM link.

10. The optical node of claim 8, where the optical switch includes a switching element with a plurality of switching components; and
where a quantity of the plurality of switching components corresponds to at least one of:
a quantity of the multiple SDM elements,
a quantity of channels per SDM element of the multiple SDM elements, or
a quantity of SDM links to which the optical switch is connected.

11. The optical node of claim 10, where the quantity of switching components is based on the quantity of the multiple SDM elements, the quantity of channels per SDM element of the multiple SDM elements, and the quantity of SDM links to which the optical switch is connected.

12. The optical node of claim 8, where the OADM includes a selector switch to selectively provide or block optical signals from different SDM elements of the SDM link.

13. The optical node of claim 8, where the optical node includes a colorless, directionless, and contentionless (CDC) optical node.

14. The OADM of claim 4, where the one or more components are to at least one of:
multiplex multiple channels in or out of an optical network;
de-multiplex multiple channels in or out of the optical network;
add multiple channels in or out of an optical network;
drop multiple channels in or out of an optical network; or
route multiple optical channels into and/or out of an optical network.

15. The OADM of claim 4, where the one or more components include a selector switch to:
add an optical signal to another SDM link of the plurality of SDM links.

16. The OADM of claim 4, where the OADM forms part of an optical network; and
where the one or more components are further to:
add an optical signal to the optical network, and
propagate the added optical signal to one or more other OADMs in the optical network.

17. The optical node of claim 8, where the optical switch includes an optical grating and a plurality of collimators.

18. The optical node of claim 17, where the optical grating includes:
a diffraction grating;
a reflective grating;
a transmissive grating; or
a beam splitter.

19. The optical switch of claim 1, further comprising:
an optical grating,
the optical grating including:
a diffraction grating;
a reflective grating;
a transmissive grating; or
a beam splitter.

20. The optical switch of claim 1, where the plurality of collimators are further to:
direct a light beam toward an optical grating.

21. The optical switch of claim 1, further comprising:
an optical grating to:
receive a plurality of light beams of different wavelengths from the one or more switching elements, and
diffract the plurality of light beams into a single light beam.

22. The optical switch of claim 1, further comprising:
a first optical grating to:
split a light beam from one of the plurality of collimators; and
a second optical grating to:
recombine the light beam after the light beam is switched by a switching element of the one or more switching elements, and
direct the light beam to an output collimator from another plurality of collimators.

* * * * *